(12) United States Patent
Tian et al.

(10) Patent No.: US 8,218,831 B2
(45) Date of Patent: Jul. 10, 2012

(54) COMBINED FACE DETECTION AND BACKGROUND REGISTRATION

(75) Inventors: Dihong Tian, San Jose, CA (US);
Joseph T. Friel, Ardmore, PA (US); J. William Mauchly, Berwyn, PA (US);
Maurice J. Buttimer, Media, PA (US);
Wen-hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1045 days.

(21) Appl. No.: 12/164,292

(22) Filed: Jun. 30, 2008

(65) Prior Publication Data
US 2009/0324023 A1 Dec. 31, 2009

(51) Int. Cl.
*G06K 9/00* (2006.01)
*G06K 9/72* (2006.01)
*G06K 9/62* (2006.01)
(52) U.S. Cl. ........ 382/118; 348/143; 382/170; 382/231; 382/225; 382/162
(58) Field of Classification Search ................. 382/118, 382/228, 103; 348/143
See application file for complete search history.

(56) References Cited

U.S. PATENT DOCUMENTS

| | | | |
|---|---|---|---|
| 6,249,318 B1 | 6/2001 | Girod et al. | |
| 6,980,526 B2 | 12/2005 | Jang et al. | |
| 7,158,674 B2 * | 1/2007 | Suh | 382/170 |
| 7,440,615 B2 * | 10/2008 | Gong et al. | 382/173 |
| 2006/0072813 A1 * | 4/2006 | Matsumoto et al. | 382/162 |
| 2006/0170769 A1 * | 8/2006 | Zhou | 348/143 |
| 2007/0183661 A1 * | 8/2007 | El-Maleh et al. | 382/173 |
| 2008/0232692 A1 * | 9/2008 | Kaku | 382/190 |

OTHER PUBLICATIONS

Dietmar Hepper, "Efficiency Analysis and Application of Uncovered Background Prediction in a Low Bit Rate Image Coder," IEEE Transactions on Communications, vol. 38, No. 9, pp. 1578-1584, Sep. 1990.
Chien et al., "Efficient Moving Object Segmentation Algorithm Using Background Registration Technique", IEEE Transactions on Circuits and Systems for Video Technology, vol. 12, No. 7, Jul. 2002 (pp. 577-586).
Gutchess et al., "A Background Model Initialization Algorithm for Video Surveillance", Computer Vision, 2001 (8 pages).

* cited by examiner

*Primary Examiner* — Vu Le
*Assistant Examiner* — Ha Le
(74) *Attorney, Agent, or Firm* — Edell, Shapiro & Finnan, LLC

(57) ABSTRACT

Techniques are provided to analyze video frames of a video signal in order to distinguish regions containing a face (and body torso) from regions that contain a relatively static background. The region containing the face is referred to as a foreground region. A current video frame is divided into a plurality of elements and the foreground regions and background regions are detected. The background regions of a subsequent video frame are detected/registered using the foreground regions of the current video frame. The foreground regions of the subsequent video frame are determined using the background regions of the current video frame as a temporal reference.

16 Claims, 6 Drawing Sheets

COMBINED FACE DETECTION AND BACKGROUND REGISTRATION

BACKGROUND

In streaming video systems such as video conferencing, the video image can be regarded as composition of a background image and a foreground image, wherein the background image consists of various stationary objects and the foreground image consists of objects that are moving. Particularly in video conferencing, the foreground image refers to people in the conference, and the background image refers to the video image that would otherwise be captured by the camera if there are no people in front of the camera.

Identifying or registering the background image and detecting faces of persons in a video stream are important for applying the appropriate intelligent coding decisions. For example, portions of a video image that correspond to a person's face are encoded differently from the encoding used for the background image. As another example, the background image may be used as a reference picture for encoding uncovered portions of the image while the foreground is moving.

Many methods for face detection are known. However, these methods generally require knowledge of the entire picture at the time of processing, which is problematic for a video conference system. In video conference systems, low latency is desired and a distributed architecture is often used to process a video image. In a distributed coding architecture, different parts of an image may be processed simultaneously in different distributed elements such that the entire image is not available. Additionally, because video conference systems generally transmit live video, the face detection architecture needs to identify facial regions of an image at a rate equal to that of the video rate.

Designers have attempted to resolve this issue with limited degrees of success. More particularly, methods solely based on the texture and color information of the video image have been found ineffective when there is a complex background. Methods that incorporate temporal information of the video image still fail to achieve reliability under various motion possibilities of the foreground image.

Therefore, what is desired are systems and methods that overcome challenges found in the art, including a method for constructing the background image and detecting and tracking the face and torso portions of a video image with a complex background at a rate equal to that of the video rate.

DESCRIPTION OF EXAMPLE EMBODIMENTS

Overview

Figure 1:
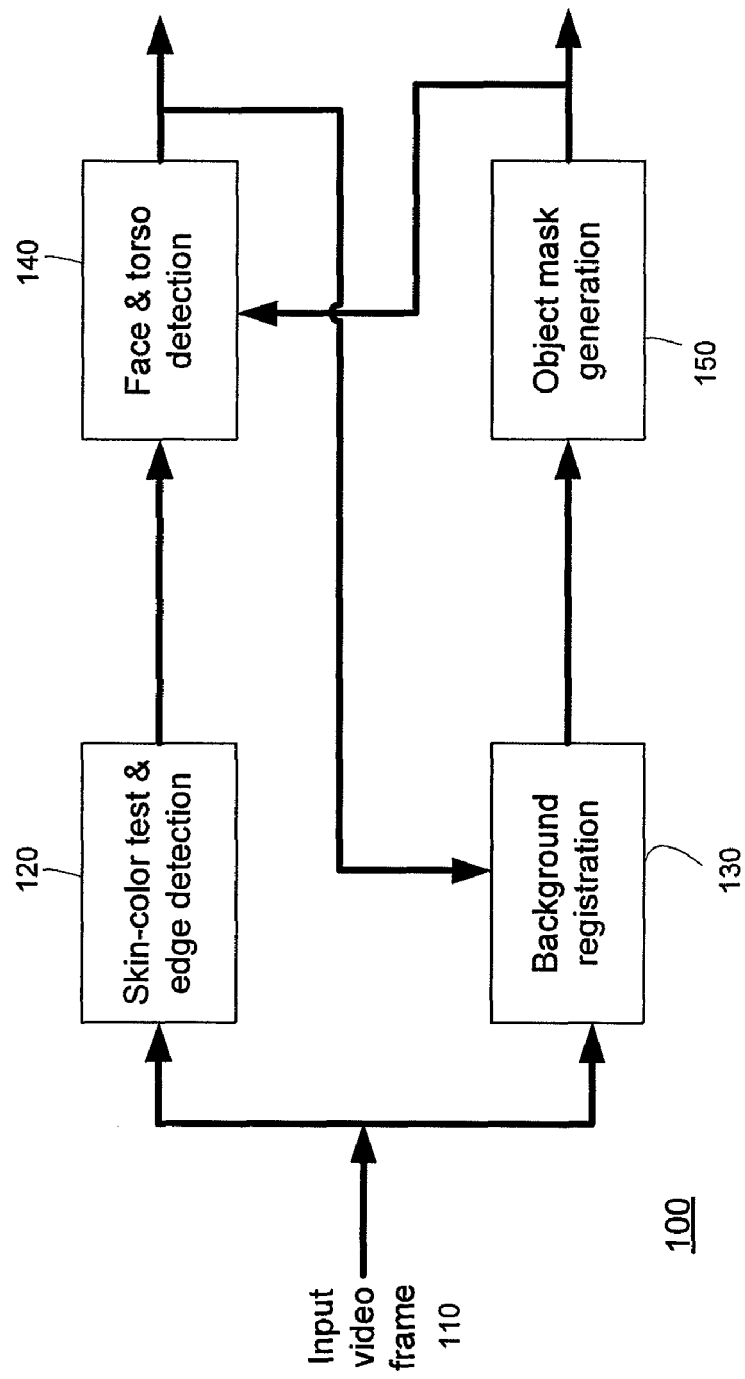
FIG. 1 illustrates an example of a flow chart depicting combined face detection and background registration logic that does not involve use of a video encoder.

Techniques are disclosed herein to analyze video frames of a video signal in order to distinguish regions containing a face (and body torso) from regions that contain a relatively static background. The region containing the face is referred to as a foreground region. A current video frame is divided into a plurality of elements and the foreground regions and background regions are detected. The background regions of a subsequent video frame are detected/registered using the foreground regions of the current video frame. The foreground regions of the subsequent video frame are determined using the background regions of the current video frame as a temporal reference.

In order to construct a complex background and provide face detection over the complex background at rates equal to that of the video rate, it is desirable to have a system that combines face detection and background registration architectures. Embodiments can be regarded as a method for constructing the background and detecting and tracking face and torso portions of a video image under various foreground moving conditions.

In one exemplary embodiment, a method for background registration and face detection is described. The method comprises constructing the background image using change-detection based temporal histograms, creating the foreground image using constructed background image, and performing face and torso detection on the created foreground image.

In an embodiment, to retain the distinction between the foreground and background portions of a video image, the face and torso detection result and background registration result are used as reference for the next video frame. To avoid the face and torso from being registered as background when a person remains still, a face and torso mask is used to define non-background areas.

Embodiments can be understood in the context of a face detection and background registration system where face and torso portions of an image are tracked at a rate equal to the video streaming rate. A distinction between the face and torso foreground and the background of a video frame is maintained when the face and torso foreground remains constant over consecutive video frames. The methods described herein may be used in a video conference system to detect the facial region of a video frame, permitting the video encoder to improve video quality by varying the encoding method for the facial regions. While applications of these techniques are described herein in the context of a video conference system, there are other applications that utilize face detection which would benefit from these techniques as well.

In accordance with one embodiment, a method combines a face detection algorithm with background registration. The method generates for each input video frame, a foreground object mask, a face and torso detection result and an updated background picture. The face and torso detection result and updated background picture are used for coding the next video frames. In an embodiment, the updated background is used to limit the color and edge based face detection algorithm to the object mask. Using the face and torso detection results from a previous video frame, false registration as background of the face and torso foreground portion of an image is reduced when the face and torso remains constant from previous video frames.

Referring first to FIG. 1, a combined face detection and background registration technique/process shown generally at 100 is described according to one embodiment. In this embodiment, a video encoder is not employed. The terms background, face, torso, object mask, edge, etc., are used in connection with the describing the combined face detection and background registration techniques. It is understood that these quantities are represented by data that is derived from data contained in video frames. For simplicity in the foregoing description, the term "data" is not used for each instance of these terms, but it is understood that these terms actually refer to data.

Input to the combined face detection and background registration process 100 is a video signal comprised of a stream of video frames. At 120, using skin-color test and edge detection, the outline of the face and torso portion of a video input frame 110 are detected. At 140, using the results from the skin-color test and edge detection at 120, in combination with an object mask generated at 150, the portion of the video frame containing face and torso images is determined by limiting the color and edge detection to the object mask. In other words, the object mask may be used to limit the portion of a video frame to be analyzed for determining the foreground image. The results of the face and torso detection at 140 are used for background registration at 130 to determine the background image of the next video frame. At 130, an input video frame 110 is processed to identify for the background image. Using the results of the face and torso detection at 140, the background registration function of 130 isolates the face and torso region of the input video frame 110 to avoid false registration of the face and torso as part of the background when the face and torso has remained constant for consecutive input video frames 110. At 150, an object mask is generated from the current background registration for use in detecting the face and torso image of a subsequent video input frame 110.

Figure 2:
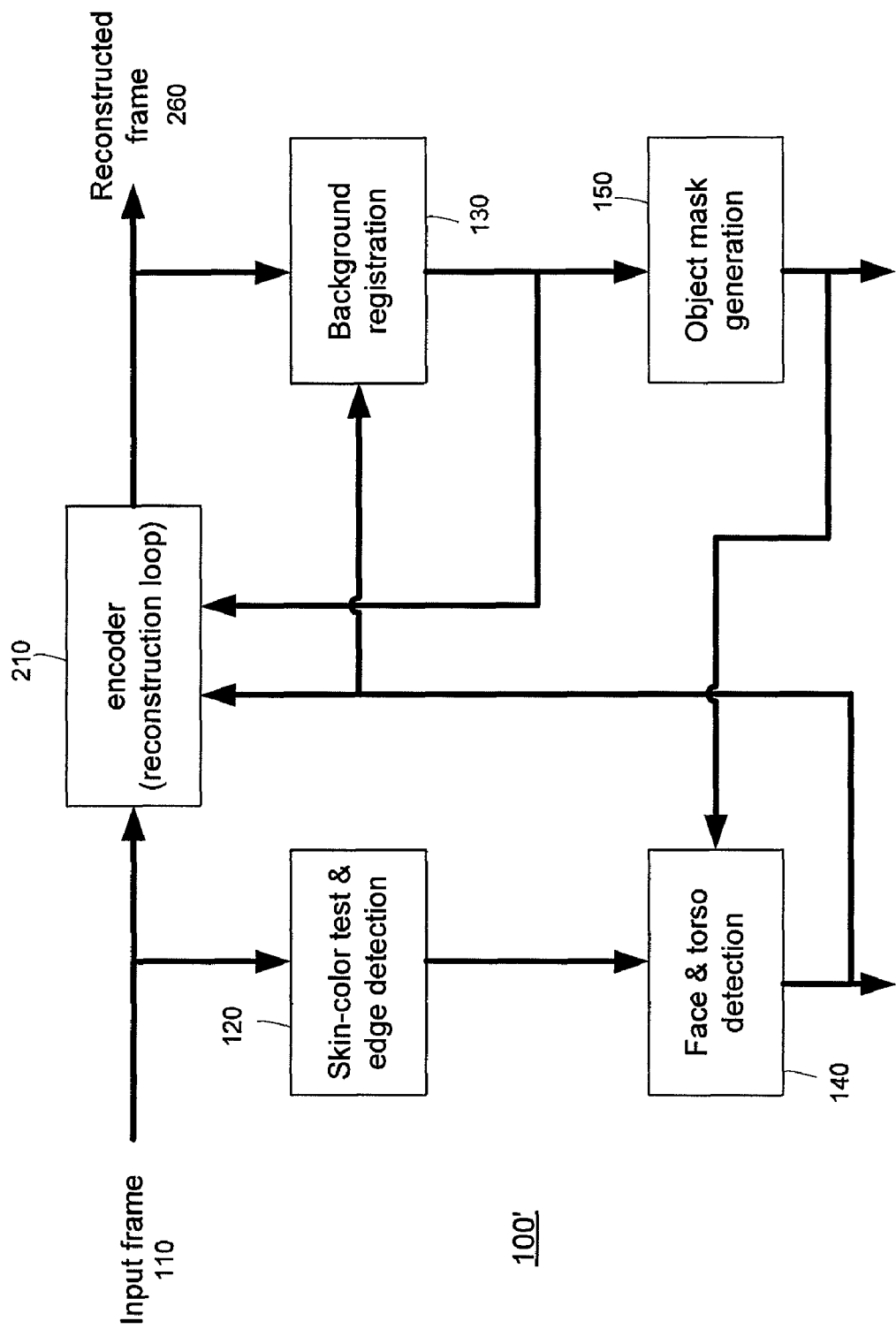
FIG. 2 illustrates an example of a flow chart depicting combined face detection and background registration logic that employs a video encoder.

FIG. 2 illustrates an example of a flow chart depicting a combined face detection and background registration technique/process shown generally at 100' which employs a video encoder/encoding function shown at 210. The video encoding function 210 produces a reconstructed video frame 260 using any video encoding technique now known or hereinafter developed. At 120, the input video frame 110 is analyzed for skin-color test and edge detection. The results are used at 140 in combination with an object mask created from a previous video frame to detect the face and torso portions of the input video frame 110. The face and torso detection result from 140 is used at 130 to register the background of the next input video frame 110. In this embodiment, background registration 130 uses the reconstructed video frame 260 from the video encoder 210 output. At 150, the registered background is used as an input to generate an object mask. The object mask is used for face and torso detection at 140 of the next input video frame 110. The video encoder 210 uses the results from the face and torso detection 140 and background registration 130 to improve the encoding of subsequent input video frames 110.

Figure 3:
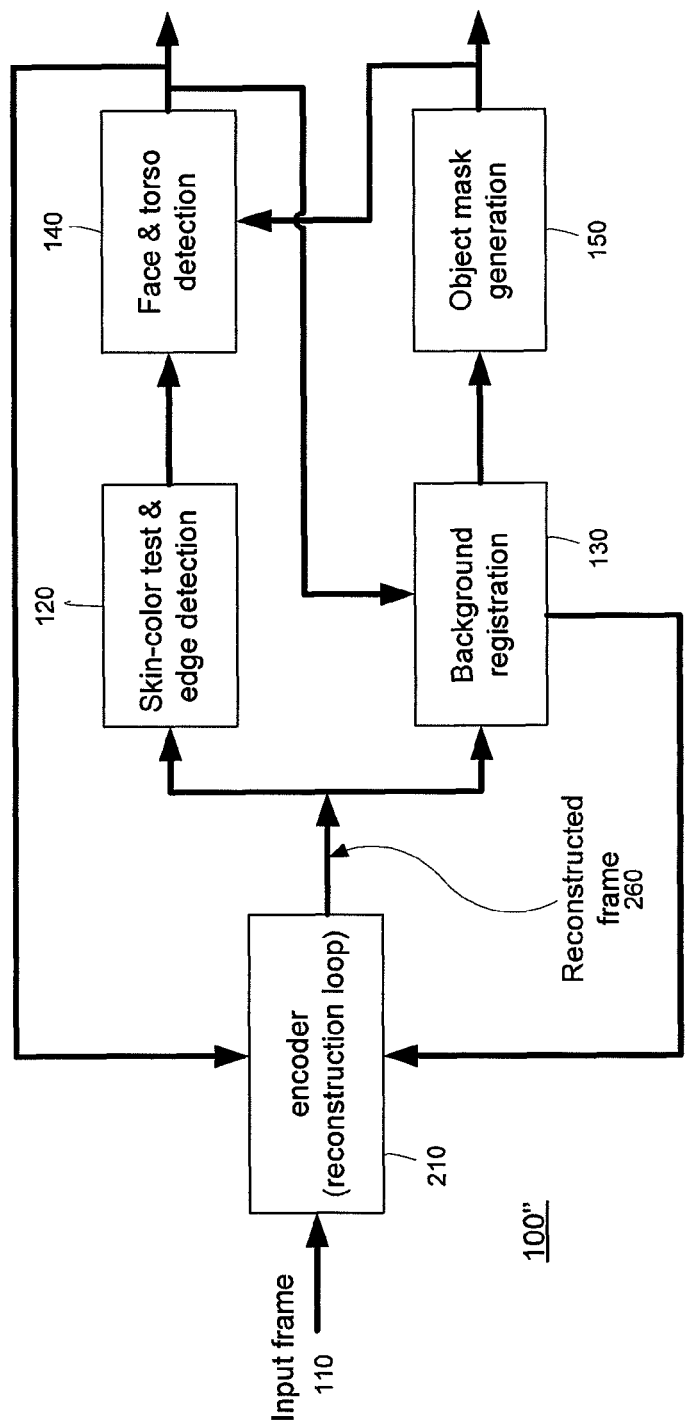
FIG. 3 illustrates an example of a flow chart depicting combined face detection and background registration logic that employs a video encoder according to another embodiment.

FIG. 3 illustrates an example of a flow chart depicting another combined face detection and background registration technique/process shown generally at 100" that employs a video encoder function 210. In this embodiment, background registration at 130 and skin-color test and edge detection at 120 both use the reconstructed video frame 260 as the input frame. The video encoder function at 210 performs face quantization ramping and uncovered background coding on the input frame 110 using the face and torso detection results 140 and the background registration from a previous video frame.

The process 100" can be replicated at the decoder (not shown) to construct and update the background reference picture in synchronization with the video encoder 210, thereby removing the need to transmit constructed background pictures.

The construction of the background reference image/picture is based on change detection. As is known in the art, a video frame may be represented by data representing a plurality of picture elements (pixels). With a stationary background and substantially constant illumination, the change detection algorithm addresses the camera and quantization noise. A threshold technique, adaptive to noise statistics, tests if a picture element, defined as a single pixel or small block of pixels, is moving or stationary, using the difference of two consecutive frames.

In one embodiment, the change detection results are accumulated along a temporal axis, that is over time across video frames (e.g., from one video frame to the next video frame). A histogram of the averaged luminance value (Y) is constructed for each picture element in the plurality of picture elements. For example, each bin of the histogram in the plurality of bins corresponds to a level between zero and so maximum value, e.g. 255. When a picture element is detected as stationary for a pre-defined number of consecutive frames (L), it is marked as a static element, and the associated bin in its histogram is incremented by one. Additionally, the associated chrominance (U and V) values are averaged and stored for each bin. This histogram construction process is performed repeatedly for every frame in a stream of video frames of a video signal. In one embodiment, a picture element is registered into the background buffer when one bin in its histogram reaches a pre-defined value.

In one embodiment, after performing the background registration for a pre-defined number of frames, an initial registration of the background is used for face detection. A background registration mask is maintained indicating the availability of background information of a picture element. For each input frame, a difference image is produced by subtracting the background image from the frame and filtering the noise. Where a complete background picture is available or the background difference aligns with the unregistered portion of the image, an object mask derives directly from the background difference image. Alternatively, the background difference image is combined with noise filtered frame differences and the background registration mask to determine the foreground object and to generate the object mask. In one embodiment, when the difference between the present video frame and the previous frame is minor, the most recent significant frame difference image is used.

Figure 4:
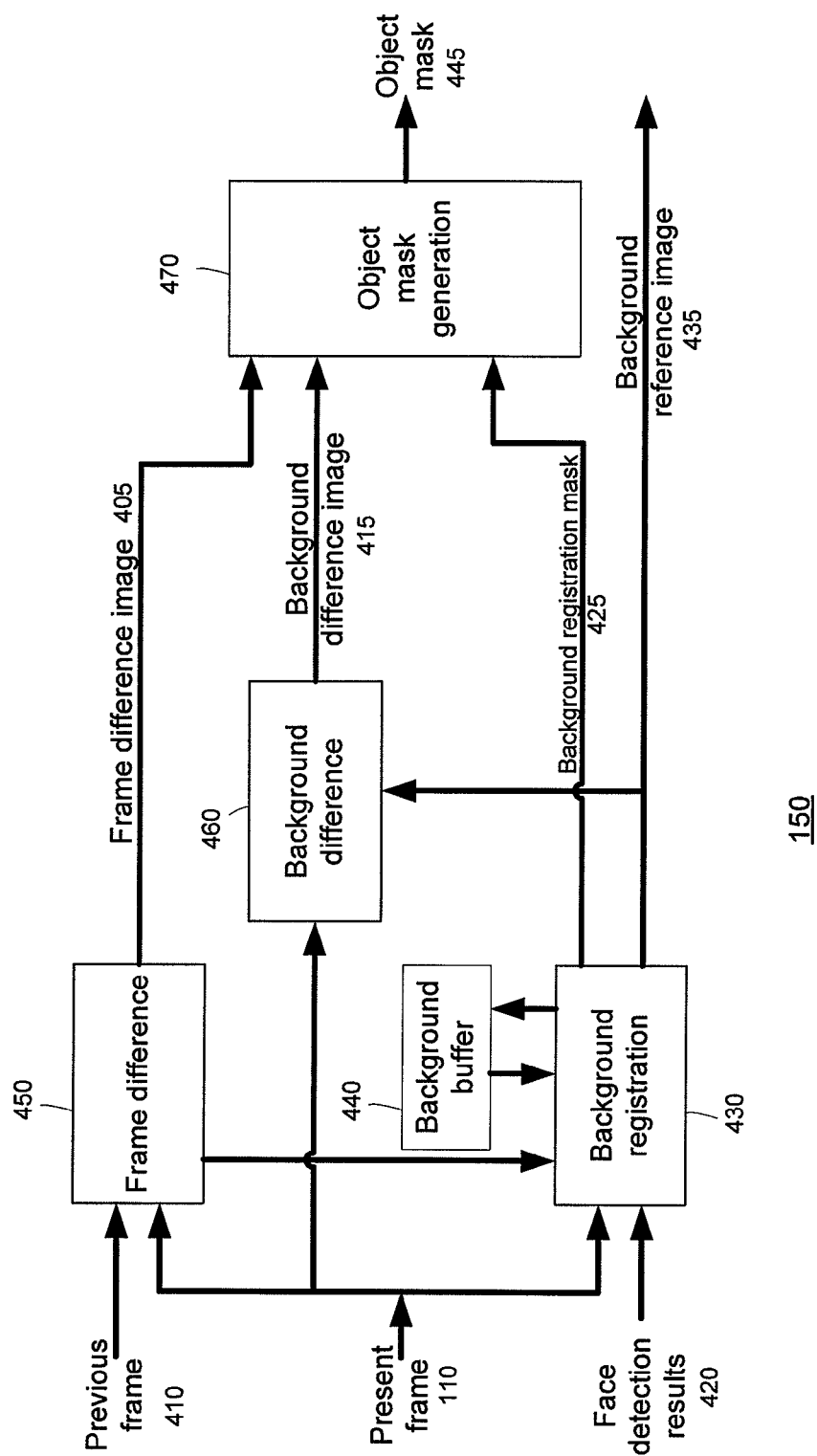
FIG. 4 illustrates an example of flow chart depicting logic for generating an object mask.

FIG. 4 illustrates an example of a flow chart for a method for generating an object mask, corresponding to the function shown at 150 in FIGS. 1-3. The inputs to the object mask generation process 150 are the current video frame 110, the previous video frame 410 and the face detection results 420 (from the face and torso detection function 140). The frame difference image is generated at 450 where a comparison is performed on the current video frame 110 and the previous frame 410. At 460, the background difference between the current video frame 110 and the previous video frame is determined. Using the background reference image 435 for comparison, the background difference function 460 generates a background difference image 415 to be used in generating the object mask. The background registration at 430 utilizes the current video frame 110, face detection results 420, and frame differences between the current video frame 110 and the previous video frame 410 to register the background of the current video frame 110. At the object mask computation function 470, the object mask 445 is generated by analyzing the frame difference image 405, the background difference image 415 and the background registration mask 425. In one embodiment, the background reference image 435 may also be used as a temporal reference for motion compensated prediction based video encoding.

In one embodiment, the object mask is applied to face detection with complex backgrounds to limit the edge and color based face detection algorithm to the object mask as opposed to the entire video frame. A complex background refers to a background picture with non-uniform color, containing texture with variable luminance values, resulting in numerous edges when performing edge detection. A simple background refers to a background with clean and uniform textures and colors, resulting in fewer edge results when performing edge detection.

In one embodiment, the detected head and torso contour is used in background registration to adjust the histograms. For example, when a picture element is within the detected face contour, the statistics of the corresponding bin in its histogram resets to zero. To account for noise, the statistics of neighboring bins are reduced to a fraction of their previous values, in proportion to their distances from the actual bin. This method is performed to reduce false registration of still face and torso as background. Alternatively, when a picture element is not within the detected contour, it may be considered to be part of the uncovered background. By adjusting the histograms to reflect such probabilities, background that is temporarily revealed by moving face and torso can be quickly registered.

In one embodiment, a histogram approach is utilized as indicated above. For every picture element in the plurality of elements, a histogram of its (averaged) Y value is constructed. A picture element may comprise small pixel blocks, for example 2×2 or 4×4, which combined creates the image. A bin in the plurality of bins in the histogram corresponds to a level between 0 and 255. Using a threshold adaptive to camera noise variances, change detection is performed on the picture element. A picture element is defined as unchanged and the corresponding bin in its histogram incremented by one when the absolution difference of the Y value from the value in the previous frame is smaller than the threshold for a pre-defined number (L) of consecutive frames. The corresponding average U and V values are stored for each bin. By running the histogram construction for a pre-defined number of frames, selecting the highest bins and the associated U and V values, the initial background is registered.

In one embodiment, to minimize false registration of still head and torso image portions as being part of the background image, the detected head and shoulder contour is fed back to the background registration to adjust the histograms. For instance, if an element is within the detected contour image portion, the corresponding bin in its histogram is reset to zero. To account for noise, the neighboring bins are reduced by a fraction of their previous values dependent on their distances from the actual bin, where the fraction follows a function that is adaptive to the noise variance.

Figure 5:
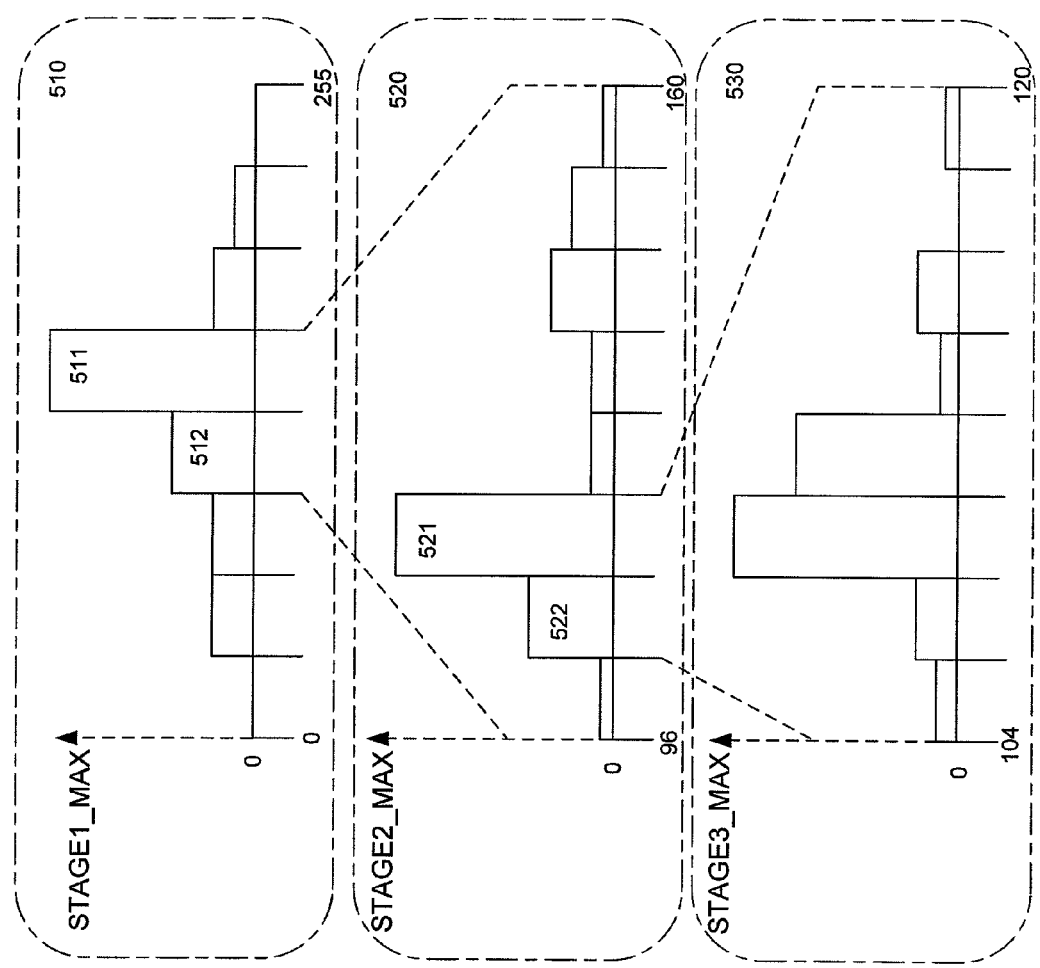
FIG. 5 illustrates an example of a three-stage luminance histogram computing according to the combined face detection and background registration techniques described herein.

In one embodiment, an algorithm using multi-stage, quantized histograms is used to reduce the memory usage from 256 bytes per pixel to approximately 1.5 bytes per pixel. As an example, a three-stage histogram is constructed for each 4×4 block of pixels. FIG. 5 illustrates an example of a three-stage luminance histogram. Each stage 510, 520, 530 consists of eight bins, with eight bits used to maintain the statistics of each bin. For the first stage 510, each bin corresponds to 32 (256/8) luminance levels. The second-stage histogram 520 divides the two adjacent bins 511, 512 with the highest luminance levels from the first stage 510 into eight bins corresponding to eight (32*2/8) levels. The third-stage histogram 530 divides the two adjacent bins 521, 522 with the highest luminance levels from the second stage 520 into eight bins, corresponding to two (8*2/8) levels each. Because every bin has eight bits, the maximum value is 255 in this example.

In one embodiment, upon a bin in the first histogram 510 reaching the maximum value of 255, the algorithm determines the best two adjacent bins. When these bins are different from the previous two bins, the second and third histograms 520, 530 are reset to zero. Alternatively, if the best two adjacent bins from the first histogram 510 is the same as the previous bins, the corresponding bin in the second histogram 520 increments by one and the bins of the first histogram 510 are generally reduced by half. Upon a bin in the second histogram 520 reaching the maximum value of 255, the bins in the second histogram 520 are reduced by half and the best two adjacent bins are selected. When these two bins are different from the previous two bins, the third histogram 530 is reset to zero. Alternatively, if the best two adjacent bins from the second histogram 520 is the same as the previous bins, the corresponding bin in the third histogram 530 increments by one. Upon a bin in the third histogram 530 reaching the maximum value of 255, the corresponding pixel element is registered as background and the value in the bins of the third histogram 530 are reduced by half.

In one embodiment, this algorithm uses (24+1) bytes per 4×4 block, where the additional 1 byte is used to store the previous best bins of the first and second histograms 510, 520. Alternatively, this additional byte can be eliminated if the maximum statistics of the third histogram 530 is reduced to seven bits per bin.

To reduce the noise associated with the background, the background registration may be processed for a period of time and the results averaged with a new value if both are within a threshold. When the average results and a new value are not within the threshold, a previous value replaces the new value.

To reduce the false background registration of the face and torso portion of an image, the face and torso contour detection is used for background registration. To adjust the histograms, when a picture element is within the face and body contour, statistics of its corresponding bin in the first-stage histogram 510 are unchanged (as opposed to being increased by 1), the statistics of its corresponding bin in the second-stage histogram 520 will be halved, and its corresponding bin in the third-stage histogram is cleared. Additionally, depending on the noise variance, the neighboring 1 or 2 bins of the third-stage histogram 530 may be cut to their quarter or half values.

When portions of the face and torso area being falsely registered as part of the background, the background registration may still be used until a new registration with adjusted histogram is available. Alternatively, the background registration may be cleared.

One skilled in the art will appreciate that the foregoing description is a functional description and that the respective functions can be performed by software, hardware, or a combination of software and hardware. Any of the functions described herein may be performed or implemented by software, hardware, or a combination of software and hardware.

Figure 6:
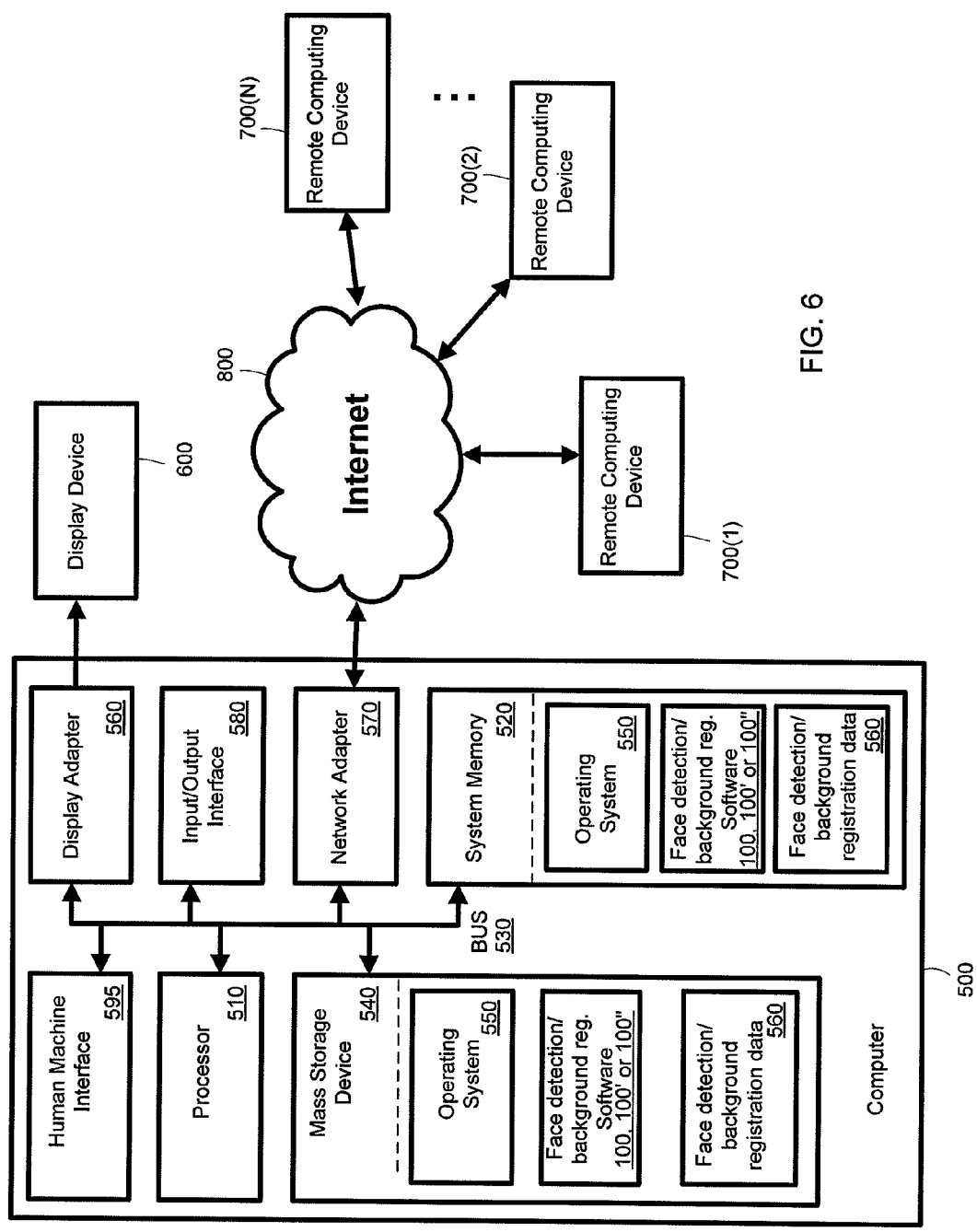
FIG. 6 illustrates an example of a block diagram of a computing system in which the combined face detection and background registration techniques may be employed.

Turning to FIG. 6, an example of a block diagram of a computing environment in which the combined face detection and background registration techniques described herein may be implemented is now described. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer shown at 500. The components of the computer 500 can comprise, but are not limited to, one or more processors or processing units 510, a system memory 520, and a system bus 530 that couples various system components including the processor 510 to the system memory 520. In the case of multiple processing units 510, the system can utilize parallel computing.

The system bus 530 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 530, and all buses specified in this description can also be implemented over a wired or wireless network connection and each of the subsystems, including the processor 510, a mass storage device 540, an operating system 550, the face detection and background registration software 100, 100' or 100", face detection and background registration data 560, a network adapter 570, an Input/Output Interface 580, a display adapter 590, a display device 600, and a human machine interface 595, can be contained within one or more remote computing devices 700(1), 700(2), . . . , 700(N) at physically separate locations (that connect to the Internet 800), connected through buses of this form, in effect implementing a fully distributed system.

The computer 500 typically comprises a variety of computer readable media. Exemplary readable media can be any available media that is accessible by the computer 500 and comprises, for example and not meant to be limiting, both volatile and non-volatile media, removable and non-removable media. The system memory 520 comprises computer readable media in the form of volatile memory, such as random access memory (RAM), and/or non-volatile memory, such as read only memory (ROM). The system memory 520 typically contains data such as face detection and background registration data 560 and/or program modules such as operating system 550 and face detection and background registration software 100, 100' or 100" that are immediately accessible to and/or are presently operated on by the processing unit 510.

In another aspect, the computer 500 can also comprise other removable/non-removable, volatile/non-volatile computer storage media. By way of example, FIG. 7 illustrates a mass storage device 540 which can provide non-volatile storage of computer code, computer readable instructions, data structures, program modules, and other data for the computer 500. For example and not meant to be limiting, a mass storage device 520 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 520, including by way of example, an operating system 550 and face detection and background registration software 100, 100' or 100". Each of the operating system 550 and face detection and background registration software 100, 100' or 100" (or some combination thereof) can comprise elements of the programming and the face detection and background registration software 100, 100' or 100". Face detection and background registration data 560 can also be stored on the mass storage device 550. Face detection and background registration data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 500 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 510 via a human machine interface 595 that is coupled to the system bus 530, but can be connected by other interface and bus structures, such as a parallel port, game port, an IEEE 1394 Port (also known as a Firewire port), a serial port, or a universal serial bus (USB).

In yet another aspect, the display device 600 can also be connected to the system bus 530 via an interface, such as a display adapter 590. It is contemplated that the computer 500 can have more than one display adapter 590 and the computer 500 can have more than one display device 600. For example, a display device can be a monitor, an LCD (Liquid Crystal Display), or a projector. In addition to the display device 600, other output peripheral devices can comprise components such as speakers (not shown) and a printer (not shown) which can be connected to the computer 500 via Input/Output Interface 580. Any step and/or result of the methods can be output in any form to an output device.

The computer 500 can operate in a networked environment using logical connections to one or more remote computing devices 700(1)-700(N). By way of example, a remote computing device can be a personal computer, portable computer, a server, a router, a network computer, a peer device or other common network node, and so on. Logical connections between the computer 500 and a remote computing device 700(1)-700(N) can be made via a local area network (LAN) and a general wide area network (WAN). Such network connections can be through a network adapter 570. A network adapter 570 can be implemented in both wired and wireless environments. Such networking environments are conventional and commonplace in offices, enterprise-wide computer networks, intranets, and the Internet 800.

For purposes of illustration, application programs and other executable program components such as the operating system 550 are illustrated herein as discrete blocks, although it is recognized that such programs and components reside at various times in different storage components of the computing device 500, and are executed by the data processor(s) of the computer. An implementation of face detection and background registration software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method comprising:

dividing a current video frame into a plurality of elements;

determining at a video rate of a video stream whether an element in the plurality of elements is part of a background image or is part of a foreground image;

determining the foreground image of a subsequent video frame based upon a combination of conducting a skin-color test and edge detection of the subsequent video frame and generating an object mask that limits the skin-color and edge detection to a portion of the subsequent video frame; and registering the background image of the subsequent video frame based on the foreground image, wherein the registering comprises:

adjusting a plurality of histograms of the elements in the background image based on the foreground image so as to reduce memory usage associated with the histograms, where the adjusting results in a subsequent histogram utilizing less memory per element in relation to a previous histogram from which the subsequent histogram is generated; and minimizing false registration of still head and torso image portions as being part of the background image by adjusting the histograms such that a bin of a histogram corresponding with an element determined to be within the head and torso image portion is set to zero.

2. The method claim of 1, wherein determining whether the element is part of the background image comprises accumulating changes detected in the element over time.

3. The method claim of 2, wherein accumulating changes detected in the element over time comprises detecting the element as being stationary when the element has not changed for a pre-defined number of video frames.

4. The method of claim 3, wherein detecting the element as stationary when the element has not changed for the pre-defined number of frames comprises using consecutive video frames.

5. The method of claim 1, wherein the object mask is generated based upon the current video frame, a previous video frame, and a foreground image determined for the previous video frame.

6. The method of claim 5, wherein generating the object mask comprises creating a frame difference image by subtracting the previous video frame from the current video frame and a background difference image between the previous video frame and the current video frame, wherein the object mask is based on the frame difference image, the background difference image and a background registration that is determined based upon the foreground image determined from the previous video frame.

7. The method of claim 1, wherein the foreground image further comprises a face and torso image of a plurality of participants in a videoconference.

8. The method of claim 1, wherein dividing the video frame into a plurality of elements comprises grouping a plurality of adjacent pixels as one element.

9. One or more non-transitory computer readable storage media encoded with software comprising computer executable instructions and when the software is executed operable to:
- divide a video frame into a plurality of elements;
- detect foreground regions of a current video frame;
- detect background regions of the current video frame; register the background regions of a subsequent video frame based on the foreground regions of the current video frame; and
- determine the foreground regions of the subsequent video frame based upon a combination of conducting a skin-color test and edge detection of the subsequent video frame and generation of an object mask that limits the skin-color and edge detection to a portion of the subsequent video frame;

wherein the instructions to register the background regions of a subsequent video frame based on the foreground regions of the current video frame further comprise:
- adjusting a plurality of histograms of the elements in the background image based on the foreground image so as to reduce memory usage associated with the histograms, where the adjusting results in a subsequent histogram utilizing less memory per element in relation to a previous histogram from which the subsequent histogram is generated; and
- minimizing false registration of still head and torso image portions as being part of the background image by adjusting the histograms such that a bin corresponding with an element determined to be within the head and torso image portion is set to zero.

10. The non-transitory computer readable storage media of claim 9, wherein the instructions to detect background regions of the current video frame comprise instructions operable to accumulate changes detected in elements over time.

11. The non-transitory computer readable storage media of claim 10, wherein the instructions to accumulate changes comprise instructions operable to detect an element as being stationary when the element has not changed for a pre-defined number of video frames.

12. The non-transitory computer readable storage media of claim 9 and further comprising instructions that are operable to create an object mask that is used to limit the portion of a video frame to be analyzed for detecting the foreground image, wherein the instructions that generate the object mask are based on a difference image between the current video frame from the subsequent video frame.

13. The non-transitory computer readable storage media of claim of 9, wherein the instructions that determine the foreground region of the subsequent video frame are configured to subtract the background regions from the subsequent video frame.

14. A method comprising:
- receiving video frames associated with a video signal;
- for a current video frame, detecting a foreground region containing a face of a person and a background region;
- for a next video frame, limiting analysis for face detection based upon a combination of conducting a skin-color test and edge detection of the next video frame and generating a foreground object mask that limits the skin-color and edge detection to a portion of the next video frame;
- dividing a video frame into a plurality of elements, and accumulating change detection results for respective elements over time across video frames, wherein accumulating change detection results comprises:
  - adjusting a plurality of histograms of the elements in the background region based on the foreground region so as to reduce memory usage associated with the histograms, where the adjusting results in a subsequent histogram utilizing less memory per element in relation to a previous histogram from which the subsequent histogram is generated; and
  - minimizing false registration of still head and torso image portions as being part of the background region by adjusting the histograms such that a bin of a histogram corresponding with an element determined to be within the head and torso image portion is set to zero.

15. The method of claim 14, wherein a bin of a histogram comprises a value that represents a luminance for an element that ranges between zero and maximum value, and the value is incremented when the element is determined to not change over a predetermined number of video frames.

16. The method of claim 14, wherein detecting comprises registering an element as part of the background region when one bin in its histogram reaches a pre-defined value.

* * * * *